(12) United States Patent
Chew

(10) Patent No.: US 10,956,102 B2
(45) Date of Patent: Mar. 23, 2021

(54) INFORMATION PROCESSING APPARATUS REGISTERING NEW DEVICE PORT NAME AND SOFTWARE TO BE CORRELATED TO EACH OTHER

(71) Applicant: BROTHER KOGYO KABUSHIKI KAISHA, Nagoya (JP)

(72) Inventor: Po Chun Chew, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/790,070

(22) Filed: Feb. 13, 2020

(65) Prior Publication Data

US 2020/0272381 A1 Aug. 27, 2020

(30) Foreign Application Priority Data

Feb. 25, 2019 (JP) .............................. JP2019-031626

(51) Int. Cl.
*G06F 3/12* (2006.01)
(52) U.S. Cl.
CPC .......... *G06F 3/1236* (2013.01); *G06F 3/1204* (2013.01); *G06F 3/1225* (2013.01); *G06F 3/1231* (2013.01)
(58) Field of Classification Search
CPC .............................. G06F 3/1236; G06F 3/1204
See application file for complete search history.

(56) References Cited

U.S. PATENT DOCUMENTS

| | | | |
|---|---|---|---|
| 2005/0055471 A1* | 3/2005 | Payne | G06F 13/102 710/5 |
| 2017/0094091 A1* | 3/2017 | Urakawa | H04L 51/24 |

FOREIGN PATENT DOCUMENTS

| | | |
|---|---|---|
| JP | 2004-215164 A | 7/2004 |
| JP | 2013-105361 A | 5/2013 |

* cited by examiner

*Primary Examiner* — Ibrahim Siddo
(74) *Attorney, Agent, or Firm* — Kenealy Vaidya LLP

(57) ABSTRACT

In an information processing apparatus, a processor firstly acquires all device port names registered in a memory, and instructs the operating system to register new device information indicating a new device. The processor secondly acquires, in response to determining that the operating system completes registering the new device information, all device port names including the new device port name associated with the new device information from the memory. The processor identifies the new device port name which is included in the secondly acquired device port names but excluded from the firstly acquired device port names by comparing the firstly acquired device port names with the secondly acquired device port names, and registers in the operating system the new device port name and the software to be correlated with each other so that the software can communicate with the new device through the new device port.

20 Claims, 6 Drawing Sheets

INFORMATION PROCESSING APPARATUS REGISTERING NEW DEVICE PORT NAME AND SOFTWARE TO BE CORRELATED TO EACH OTHER

CROSS REFERENCE TO RELATED APPLICATION

This application claims priority from Japanese Patent Application No. 2019-031626 filed Feb. 25, 2019. The entire content of the priority application is incorporated herein by reference.

TECHNICAL FIELD

The present disclosure relates to a technique for setting up software on an information processing apparatus that is connected to another device.

BACKGROUND

There is known an external equipment control program that is installed on a personal computer, which is connected to a printer by a wireless communication method, such as Bluetooth (registered trademark). The external equipment control program stores a port name in association with a Bluetooth address and a printer name. When the user accesses the properties of the port or the properties of the printer, the external equipment control program displays the port name, Bluetooth address, and printer name.

SUMMARY

In the conventional technology described above, the user must access properties to confirm the port name and printer name.

In view of the foregoing, it is an object of the present disclosure to provide a technique for setting up software on an information processing apparatus without requiring the user to perform an operation to access properties.

In order to attain the above and other objects, the disclosure provides a non-transitory computer readable storage medium storing a set of program instructions executed by a computer included in an information processing apparatus. The information processing apparatus further includes a communication interface and a memory storing an operating system. The operating system has a function to register a device port name and device information associated with each other in the memory. The device information indicates a device. The device port name indicates a device port defined for the communication interface to communicate with the device. The set of program instructions is for setting up a software. The set of program instructions, when executed by the computer, causes the information processing apparatus to perform: firstly acquiring all device port names registered in the memory; instructing the operating system to register new device information indicating a new device after the all device port names are acquired, the operating system registering the new device information and a new device port name associated to each other in the memory according to the instructing, the new device port name being a name of a new device port defined for the communication interface; determining whether the operating system completes registering the new device information according to the instructing; secondly acquiring, in response to determining that the operating system completes registering the new device information, all device port names including the new device port name associated with the new device information from the memory; identifying the new device port name which is included in the secondly acquired device port names but excluded from the firstly acquired device port names by comparing the firstly acquired device port names with the secondly acquired device port names; and registering in the operating system the new device port name and the software to be correlated with each other so that the software can communicate with the new device through the new device port defined for the communication interface.

According to another aspect, the disclosure provides an information processing apparatus. The information processing apparatus includes a communication interface, a memory, and a processor. The memory stores an operating system. The operating system has a function to register a device port name and device information associated with each other in the memory. The device information indicates a device. The device port name indicates a device port defined for the communication interface to communicate with the device. The memory further stores instructions for setting up a software, when executed by the processor, causing the processor configured to perform: firstly acquiring all device port names registered in the memory; instructing the operating system to register new device information indicating a new device after the all device port names are acquired, the operating system registering the new device information and a new device port name associated to each other in the memory according to the instructing, the new device port name being a name of a new device port defined for the communication interface; determining whether the operating system completes registering the new device information according to the instructing; secondly acquiring, in response to determining that the operating system completes registering the new device information, all device port names including the new device port name associated with the new device information from the memory; identifying the new device port name which is included in the secondly acquired device port names but excluded from the firstly acquired device port names by comparing the firstly acquired device port names with the secondly acquired device port names; and registering in the operating system the new device port name and the software to be correlated with each other so that the software can communicate with the new device through the new device port defined for the communication interface.

According to still another aspect, the disclosure provides a method for an information processing apparatus. The information processing apparatus includes a communication interface and a memory storing an operating system. The operating system has a function to register a device port name and device information associated with each other in the memory. The device information indicates a device. The device port name indicates a device port defined for the communication interface to communicate with the device. The method is for setting up a software and includes: firstly acquiring all device port names registered in the memory; instructing the operating system to register new device information indicating a new device after the all device port names are acquired, the operating system registering the new device information and a new device port name associated to each other in the memory according to the instructing, the new device port name being a name of a new device port defined for the communication interface; determining whether the operating system completes registering the new device information according to the instructing; secondly acquiring, in response to determining that the operating system completes registering the new device information, all device port names including the new device port name associated with the new device information from the memory; identifying the new device port name which is included in the secondly acquired device port names but excluded from the firstly acquired device port names by comparing the firstly acquired device port names with the secondly acquired device port names; and registering in the operating system the new device port name and the software to be correlated with each other so that the software can communicate with the new device through the new device port defined for the communication interface.

BRIEF DESCRIPTION OF THE DRAWINGS

The particular features and advantages of the disclosure as well as other objects will become apparent from the following description taken in connection with the accompanying drawings, in which.

DETAILED DESCRIPTION

The embodiment according to the invention will be described while referring to attached drawings. It would be apparent to those skilled in the art that various changes and modifications may be made thereto. For example, the order in which processes or steps described below are performed may be modified in any way that does not produce any inconsistencies of the process.

Figure 1:
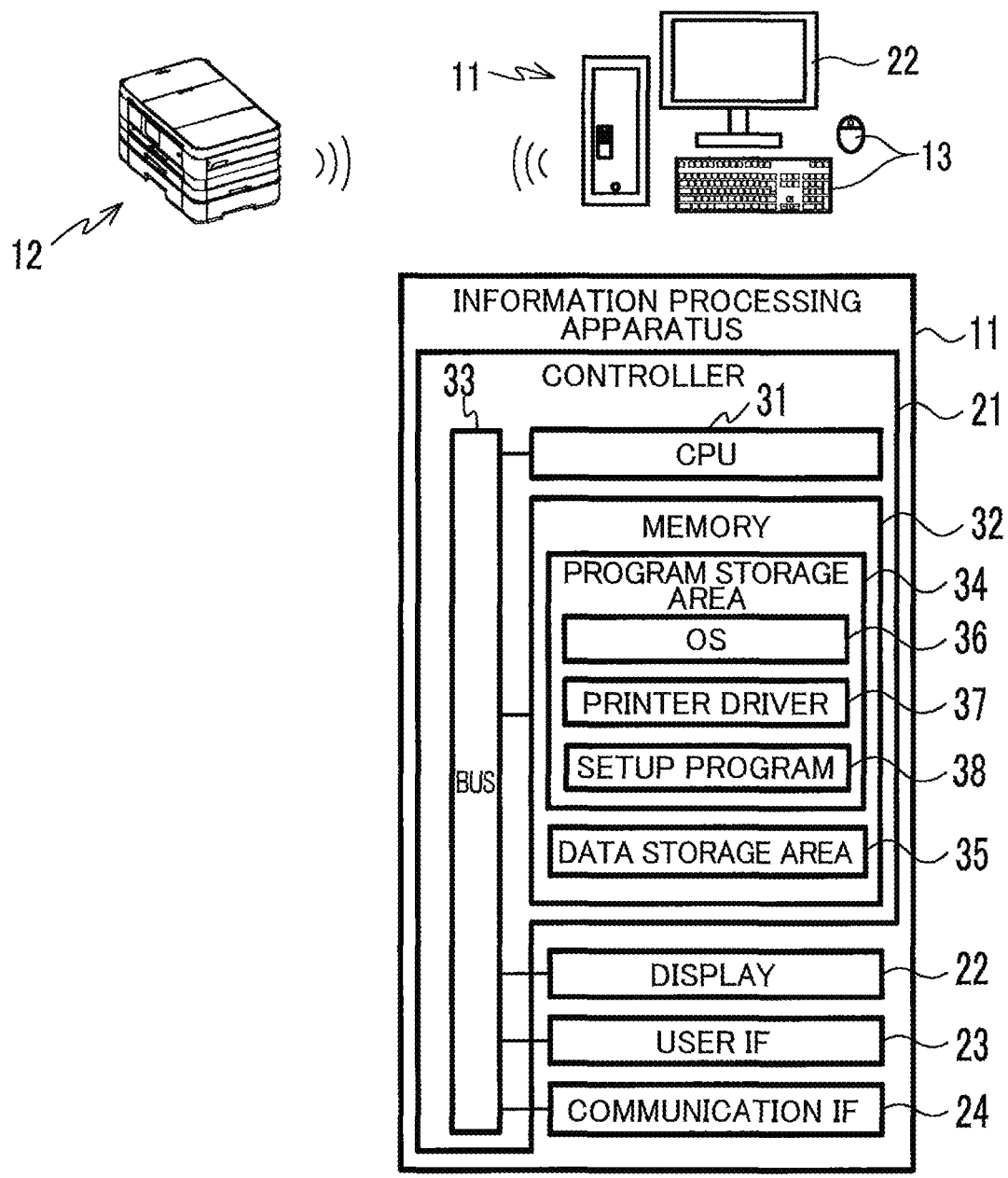
FIG. 1 is a functional block diagram illustrating an information processing apparatus according to an embodiment.

FIG. 1 shows an information processing apparatus 11 according to an embodiment of the present invention. The information processing apparatus 11 may be a personal computer, a portable device, or a tablet computer, for example. A printer driver 37 is installed on the information processing apparatus 11 for generating print data to be transmitted to a printer 12. The printer driver 37 is set up on the information processing apparatus 11 by a setup program 38. The setup process will be described later in detail.

The information processing apparatus 11 is provided with a controller 21, a display 22, a user interface 23, and a communication interface 24.

The communication interface 24 performs communications with devices using the USB (registered trademark) communication protocol or wired/wireless LAN (registered trademark) communication protocols, for example. The wireless LAN communication protocol includes the Bluetooth (registered trademark) communication protocol. In the following description, Bluetooth will be designated by "BT".

The user interface 23 is for connecting input devices 13 to the electronic components in the information processing apparatus 11, such as a CPU 31 (described later). The input devices 13 may include a mouse, keyboard, and the like. The user interface 23 communicates with the input devices 13 using a protocol such as RS-232C. Information the user inputs with the input devices 13 is inputted into the controller 21 via the user interface 23.

The controller 21 has the central processing unit (CPU) 31, a memory 32, and a bus 33. The CPU 31 and the memory 32 are connected to the bus 33. The CPU 31 reads information and data from the memory 32 via the bus 33 and stores information and data in the memory 32 via the bus 33. The CPU 31 is an example of the computer.

The bus 33 is also connected to the display 22, the user interface 23, and the communication interface 24. The CPU 31 transmits information and data to the display 22 via the bus 33 to display images on the display 22, and receives via the bus 33 information inputted by the user using the user interface 23. The CPU 31 transmits information and data to the printer 12 and other devices via the bus 33 and the communication interface 24. The communication interface 24 is an example of the communication interface.

The memory 32 has a program storage area 34 and a data storage area 35. The memory 32 includes ROM, RAM, EEPROM, a hard disk drive, a USB memory or other portable storage medium, a buffer provided in the CPU 31, and the like.

The memory 32 may be any storage medium that can be read by a computer. A computer-readable storage medium is a non-transitory medium. In addition to the above examples, non-transitory media include CD-ROM and DVD-ROM. A non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

The program storage area 34 stores an operating system (OS) 36, a printer driver 37, and a setup program 38.

The printer driver 37 is a program that generates print data that is written in a page description language (PDL) so that the printer 12 can print. The printer driver 37 is an example of the software.

The OS 36 may be Windows (registered trademark), Linux (registered trademark), Android (registered trademark), or macOS (registered trademark), for example.

The OS 36 has a function for assigning communication ports with devices (for example, the printer 12) that are connected to the information processing apparatus 11 via the communication interface 24, and for communicating with the devices via the established communication ports. The communication port is an example of the device port.

The OS 36 also has a registration function for storing a port name indicating the established communication port in the memory 32 in association with the device name specifying the device. When the properties of the device are accessed, for example, the OS 36 displays the port name and the device name for the device on the display 22.

The OS 36 also has a notification function for returning all port names stored in the memory 32 and device names associated with those port names to another program installed on the information processing apparatus 11 when the other program requests this information. More specifically, upon receiving a command from a program requesting port names and device names, the OS 36 returns all port names stored in the memory 32 and device names associated with those port names to the program that inputted the command.

Depending on the communication protocol, the OS 36 sets the port name specifying the communication port associated with each device. The port name is set to USB1, COM1, or the IP address of the device, for example. If the communication protocol is BT, for example, the OS 36 sets port names for a plurality of devices to COM1, COM2, COM3, COM4, COM5, etc. In response to a user instruction to delete a communication port, the OS 36 deletes the communication port name from the memory 32. For example, the OS 36 may delete COM3 from the memory 32. Subsequently, when a new device is subsequently connected to the information processing apparatus 11, the OS 36 may set the new port name for the new device to COM3, which is now available, and stores the name of the new device in the memory 32 in association with COM3. In other words, the communication port name does not specify an assigning order that indicates the order in which the communication ports were assigned or an adding order that indicates the order in which devices were added. Hence, by simply acquiring the port names and the device names stored in the memory 32, a program cannot determine which communication port was most recently assigned.

The OS 36 also does not have a function for storing the assigning order for communication ports in the memory 32. Accordingly, a program cannot issue a request to the OS 36 for the port name of the most recently assigned communication port. In other words, the OS 36 does not have a function for returning the port name of the most recently assigned communication port. Therefore, the setup program 38 must determine the port name for the most recently assigned communication port by executing an identification process described later (S28).

The OS 36 also has a correlating function for automatically correlating programs to established communication ports. More specifically, in a case where the printer 12 as a device is connected to the information processing apparatus 11 and a specific communication protocol is specified, the OS 36 sets up the printer driver 37 according to a specific first communication profile so that the printer driver 37 supporting the printer 12 is correlated to the printer 12. The specific communication protocol is BT, for example, and the specific first communication profile is the Hardcopy Cable Replacement Profile (HCRP), for example. HCRP is an example of the first communication profile.

However, regarding a specific second communication profile defined for the specific communication protocol, the OS 36 does not have a correlating function for automatically correlating programs (for example, the driver 37) to established communication ports for the specific second communication profile. Here, the specific communication protocol is BT, for example, and the specific second communication profile is the Serial Port Profile (SPP), for example. SPP is an example of the specific communication profile and the second communication profile.

Hence, in a case where the information processing apparatus 11 communicates with a device according to the specific second communication profile of the specific communication protocol, it is required that the setup program 38 sets up the printer driver 37 in advance so that the printer driver 37 can use the communication port that the OS 36 has assigned to the device.

The setup program 38 is the program that sets up the printer driver 37 according to the specific second communication profile of the specific communication protocol. The setup program 38 is also known as an installer. A setup process implemented by the setup program 38 to set up the printer driver 37 will be described later. The setup program 38 is an example of the program.

The CPU 31 executes the OS 36, the setup program 38, and other programs in a pseudo-parallel manner. In other words, the CPU 31 uses multitasking to execute the OS 36 and the setup program 38.

The data storage area 35 stores information and data required for executing the OS 36, the printer driver 37, and the setup program 38.

The printer 12 is an example of the device described above. The printer 12 is provided with a print engine that prints images on sheets based on inputted print data, a controller that controls driving of the print engine, and a communication interface having the same configuration as the communication interface 24 described above. The printer 12 communicates with the information processing apparatus 11 using this communication interface.

The controller of the printer 12 possesses a memory. The memory stores printer information such as the device name, IP address, MAC address, and BT address of the printer 12. The printer information may be a management information base (MIB), for example. In response to a request for printer information received from the information processing apparatus 11, the controller of the printer 12 returns the printer information to the information processing apparatus 11. The default printer name for the printer 12 includes the model name of the printer 12. Note that the device name is user-modifiable and, hence, may have been changed by the user. The printer information may include the model name separate from the device name.

Next, a setup process implemented by the setup program 38 will be described with reference to FIGS. 2, 3, and 4. In this example, the setup program 38 sets up the printer driver 37 according to SPP, which is the specific second communication profile of the specific communication protocol, which is BT.

Processes in this specification depict steps performed by the CPU 31 according to instructions described in programs, such as the setup program 38 and the OS 36. In other words, actions such as "determine," "extract," "select," "calculate," "decide," "identify," "acquire", "receive", "control," "set", and the like in the following description represent steps performed by the CPU 31. Steps performed by the CPU 31 include processes for hardware control via the controller 21 such as the OS 36. "Acquiring" is used as a concept which does not necessarily require a request. In other words, the process in which the CPU 31 receives data without requesting is included in the concept of "the CPU 31 acquires data." "Data" as described herein refer to bit strings that can be read by a computer. Data of different formats are treated as the same data when the content of the data is essentially the same. The same holds true for "information" in this specification. Processes for an "instruction," a "response," and a "request" are processed by communicating information or data indicated in the "instruction," the "response," and the "request." The terms "instruction," "response," and "request" may also be used to describe information indicating an "instruction," a "response," and a "request."

Further, steps performed by the CPU 31 according to instructions described in a program may be described in abbreviated terms, such as "the CPU 31 executes" or "the setup program 38 executes", "the OS 31 executes", or "the controller 21 executes." Similarly, the input and output of information performed by the OS 36 or the setup program 38 via a communication interface 24 or the user interface 23 may be described in abbreviated terms, such as "the CPU 31 returns," or "the setup program 38 transmits".

Further, a process performed by the CPU 31 to determine whether information A indicates circumstance B may be described conceptually as "determining based on information A whether circumstance B." A process in which the CPU determines whether information A indicates circumstance B or circumstance C may be described conceptually as "determining based on information A whether circumstance B or circumstance C."

Note that the terms "data" and "information" in the following descriptions used share aspects of being bits or bit strings that computers can handle. The computer treats "data" without considering the significance of its individual bits. In the case of "information," on the other hand, the computer's operations branch based on the significance of the individual bits. Additionally, an "instruction" is a control signal prompting the destination apparatus to perform the next operation. An instruction may include information and may itself possess the properties of information.

Further, data and information are treated as the same data and information even when the format (such as a text format, binary format, or flag format) is modified for different computers, provided that the computers can recognize the same content. For example, information specifying the number "two" may be stored in one computer as information in the text format for the ASCII code "0x32", and may be stored in a different computer as information in the binary format for the binary notation "10".

However, the distinction between data and information is not strictly enforced; exceptions to the rule may be allowed. For example, data may be temporarily treated as information, while information may be temporarily treated as data. Further, certain bits or bit strings may be treated as data on one apparatus and treated as information on another. Further, information may be extracted from data, and data may be extracted from information.

Further, the phrase "in response to" in this specification indicates that the process is to be executed when the condition specified after the phrase has been met. Note that the timing at which the process is executed should be after the condition has been met, but need not be immediately after the condition is met.

In S11 the setup program 38 starts up in response to an instruction that the user inputs into the information processing apparatus 11 using the input devices 13 or in response to an instruction received from the OS 36 or another program stored in the memory 32.

After starting up, in S12 the setup program 38 acquires the device name of the printer supported by the printer driver 37 that is the object of the setup process. For example, the setup program 38 may display a screen on the display 22 for receiving a user selection of a device name, and acquires a device name that the user selects using the input devices 13. Alternatively, the setup program 38 may read and acquire the device name from a settings file stored in the memory 32. Alternatively, the setup program 38 may acquire a device name specified by the OS 36 or the other program upon startup.

In S13 the setup program 38 displays a BT/USB selection screen on the display 22 for prompting the user to select a type of communication protocol. In S14 the setup program 38 receives a user selection for USB or BT, and determines whether the selected communication protocol is for USB or BT.

If the setup program 38 determines that USB was selected (S14: USB), in S15 the setup program 38 executes a USB configuration process to setup the printer driver 37 to be capable of using the USB, and subsequently ends the setup process. The USB configuration process is well known and a detailed description of this process will not be given here. The USB configuration process of S15 in which the setup program 38 sets up the printer driver 37 to be capable of using the USB is an example of the normal setup process.

If the setup program 38 determines in S14 that BT was selected (S14: BT), in S16 the setup program 38 issues a request to the OS 36 for COM port names and the device names associated with those COM port names. Here, a COM port name is a name specifying a communication port (hereinafter "COM port"). Specifically, the setup program 38 inputs a COM port request command into the OS 36 requesting the OS 36 to return information specified in the properties of the COM port. The COM port name is an example of the device port name. The process in which the setup program 38 receives (or acquires) a user selection for USB or a user selection for BT is an example of the designated protocol acquisition process. BT is an example of the specific communication protocol, and the process of S14 in which the setup program 38 determines whether BT or USB was selected is an example of the protocol determination process.

In response to receiving the COM port request command, in S17 the OS 36 returns the COM port names set in the OS 36 and the device names associated with those COM port names. The process of S17 for acquiring the COM port names is an example of the first acquisition process and the first acquisition step.

In S17 the setup program 38 receives the COM port names and device names returned by the OS 36, and stores the presently acquired COM port names and device names in the memory 32.

After storing the COM port names and device names in the memory 32, in S18 the setup program 38 issues an add device instruction to the OS 36 instructing the OS 36 to add a new device (specifically, instruction for registering a device name of the new device) to the memory 32 of the information processing apparatus 11. The process in S18 is an example of the add device instruction process and add device instruction step.

In addition to issuing the add device instruction, the setup program 38 provides the OS 36 with information that the OS 36 needs to identify the printer driver 37, such as the path specifying the printer driver 37.

While not shown in the flowchart, when the setup program 38 determines in S14 that BT was selected (S14: BT), the setup program 38 may display a screen on the display 22 prompting the user to turn on the BT function on the printer 12. Upon seeing this screen, the user will turn on the BT function on the printer 12. Once the BT function has been turned on, the printer 12 can communicate with the information processing apparatus 11 using the BT communication protocol.

After receiving an add device instruction, in S19 the OS 36 displays a device selection screen on the display 22 for receiving a user selection for a device. For example, the OS 36 may transmit, via the communication interface 24 using the BT communication protocol, instructions requesting devices to return information having the device names thereof. Subsequently, the OS 36 displays the device names returned from the devices on the display 22. In S20 the OS 36 continues to display the device selection screen on the display 22 while the user has not yet used the input devices 13 to select the device name of the printer 12 (S20: NO).

When the OS 36 determines that the user has selected a device name (S20: YES), in S21 the OS 36 assigns a new COM port with the selected device name, and in S22 registers in the OS 36 itself the COM port name specifying the newly assigned COM port in association with the device name selected by the user. In other words, in S22 the OS 36 stores information associating the COM port name specifying the new COM port and the user-selected device name in the memory 32. In the following description, the COM port name specifying the newly established (assigned) COM port will be called the added COM port name, and the device name of the printer 12 serving as the newly added device will be called the added device name. The printer 12 indicated by the user-selected device name is an example of the added device. The COM port name set (assigned) by the OS 36 in S21 is an example of the added device port name.

Note that in addition to the new COM port, in S21 the OS 36 sets a new HCRP port to support HCRP of BT. Using the correlating function described above, the OS 36 registers in the OS 36 itself the printer driver 37, whose information is received from the setup program 38 together with the add device instruction in S18, so that the printer driver 37 is in association with the added device name and the added HCRP port name specifying the new HCRP port. In other words, the OS 36 stores information in the memory 32 associating the printer driver 37 with the added HCRP port name and the added device name.

In S23 the OS 36 closes the device selection screen after the added COM port name and the added device name have been registered in the OS 36.

In the meantime, the setup program 38 has been continuously monitoring the device selection screen in S24, and determining whether the device selection screen was closed in S25. That is, when the device selection screen was not closed (S25: NO), the setup program 38 returns to S24. When the setup program 38 determines that the device selection screen was closed (S25: YES), in S26 the setup program 38 repeats the process described in S16 by issuing a request to the OS 36 to return the COM port names stored in the memory 32 and the device names associated with those COM port names. In other words, in S26 the setup program 38 issues to the OS 36 a request for information specified in the COM port properties after the added COM port name and added device name were added. The process in which the setup program 38 determines whether the device selection screen was closed is an example of the determination process and the determination step.

Note that the setup program 38 may execute a different process from that shown in S24 and S25 for monitoring the device selection screen and determining whether the device selection screen was closed, provided that the setup program 38 can determine that the OS 36 has completed the process of storing an added COM port name and added device name in the memory 32.

After receiving the COM port request command, in S27 the OS 36 returns COM port names including the added COM port name and device names including the added device name.

In S27 the setup program 38 receives the COM port names including the added COM port name and the device names including the added device name, and stores the presently acquired COM port names and device names in the memory 32. The process of S27 in which the setup program 38 acquires COM port names including the added COM port name and device names including the added device name is an example of the second acquisition process and the second acquisition step.

In S28 the setup program 38 performs an identification process to identify the added COM port name and the added device name by comparing the COM port names and device names acquired and stored in the memory 32 in S17 with the COM port names and device names acquired and stored in the memory 32 in S27. Specifically, the setup program 38 identifies the COM port name and the device name that were acquired and stored in the memory 32 in S27 but not acquired and stored in the memory 32 in S17, and determines that they are the added COM port name and the added device name. The identification process of S28 is an example of the identification step.

As described above, the OS 36 does not have a function for returning the COM port name specifying the most recently assigned COM port in response to a request. However, by executing the process in steps S16, S17, S26, and S27 and the identification process of S28, the setup program 38 can acquire the COM port name specifying the most recently assigned COM port.

In S29 the setup program 38 displays an SPP/HCRP selection screen on the display 22 for receiving a user selection for SPP or HCRP. In S30 the setup program 38 determines whether the user has selected either SPP or HCRP. The user operation for selecting either SPP or HCRP is an example of the user designation. The user-selected SPP or HCRP is an example of the designated communication profile. The process of S30 in which the setup program 38 receives a user selection for SPP or HCRP is an example of the designated profile acquisition process.

If the setup program 38 determines that the user has selected HCRP (S30: HCRP), in S31 the setup program 38 executes an HCRP configuration process. As described above, the OS 36 establishes an HCRP port, and assigns the printer driver 37 to the established HCRP port so as to set up the printer driver 37 when a device is selected in the device selection screen (S20: YES). Hence, the OS 36 has already set up the printer driver 37 to be capable of using the HCRP. In the HCRP configuration process of S31, the setup program 38 may display a notification screen on the display 22 notifying the user that the printer driver 37 has been set up, for example.

However, if the setup program 38 determines in S30 that SPP was selected (S30: SPP), in S32 the setup program 38 executes a port selection screen display process to display the port selection screen shown in FIG. 4(A) on the display 22.

The port selection screen has the text "Please select a port," a pull-down menu 41 by which the user can select a device name and COM port name, a "Return" icon 42, a "Next" icon 43, and a "Cancel" icon 44. The process of S32 in which the setup program 38 displays the port selection screen on the display 22 is an example of the display process. The device names and COM port names displayed in the port selection screen are an example of the display information.

Here, the port selection screen display process will be described with reference to FIG. 3. In S41 at the beginning of this process, the setup program 38 sets an initial display name. The initial display name constitutes the device name and the COM port name that will be displayed initially in the pull-down menu 41. Specifically, the setup program 38 sets the added device name and the added COM port name identified in the identification process of S28 (FIG. 2) as the initial display name. In the example shown in FIG. 4(A), the setup program 38 has set the device name "A-0123" of the printer 12 and the COM port name "COM3" that the OS 36 assigned in S21 (that is, identified in S28) as the initial display name.

In S42 the setup program 38 determines the device names and COM port names to be displayed in a list on the display 22 when the user selects the pull-down menu 41 using the input devices 13. Specifically, the setup program 38 sets the device names and COM port names acquired and stored in the memory 32 in S27 as those device names and COM port names to be listed.

In S44 the setup program 38 acquires the MAC addresses or BT addresses of the devices specified by the device names acquired and stored in the memory 32 in S27 in order to determine a display order for the pairs of the device names and COM port names in the displayed list. Specifically, the setup program 38 inputs a command into the OS 36 accompanied by the device names acquired in S27. Upon receiving the inputted command, the OS 36 returns to the setup program 38 the MAC addresses or BT addresses stored in the memory 32 in association with the device names attached to the command. The setup program 38 receives the MAC addresses or the BT addresses returned by the OS 36. Note that the setup program 38 may acquire both MAC addresses and the BT addresses.

The setup program 38 uses the device name acquired in S12 and the MAC addresses or the BT addresses acquired in S44 to determine a display order for the pairs of the device names and the COM port names that will be displayed in a list.

Specifically, in S45 the setup program 38 determines whether any device names matching the device name acquired by the setup program 38 in S12 are included in the device names that were acquired and stored in the memory 32 in S27. In other words, the setup program 38 determines in S45 whether the device names acquired and stored in the memory 32 in S27 specifies a printer supported by the printer driver 37.

If the setup program 38 determines that the device names acquired in S27 matches the device name acquired in S12 (S45: YES), in S46 the setup program 38 sets the pairs of the matching device names and their port names to the upper portion of the display. Setting device names to the upper portion of the display signifies that the matching device names and their COM port names will be displayed in the upper portion of the list of the pairs of the device names and the COM port names arranged in the vertical direction in the port selection screen. In other words, the pairs of device names and COM port names supported by the printer driver 37 set up by the setup program 38 are displayed in the upper portion in the list. In the present example, the pair of "A-0123" and "COM3", and the pair of "A-0123" and "COM1" are set to be displayed in the upper portion.

Figure 4A:
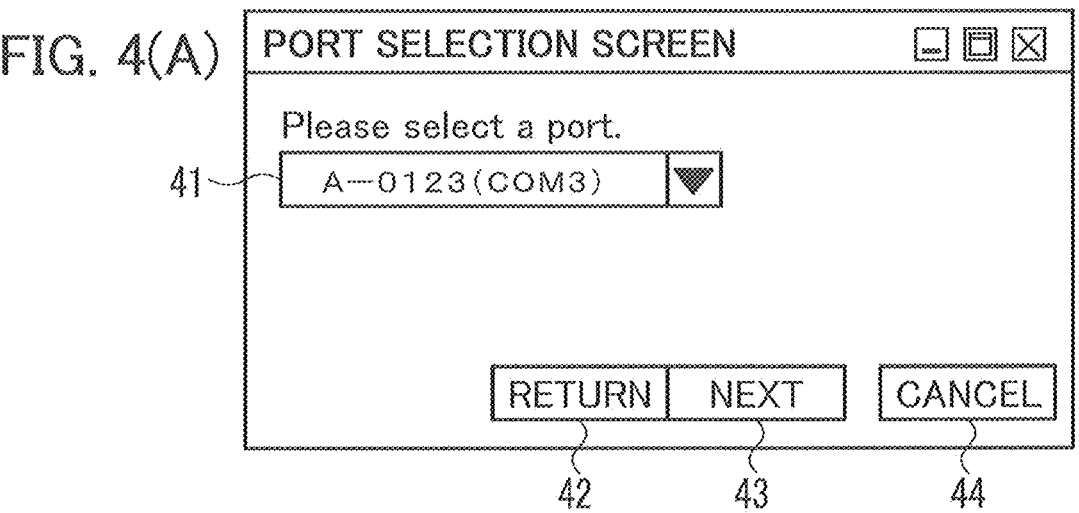
FIGS. 4(A) and 4(B) are explanatory diagrams illustrating a port selection screen.
Figure 4B:
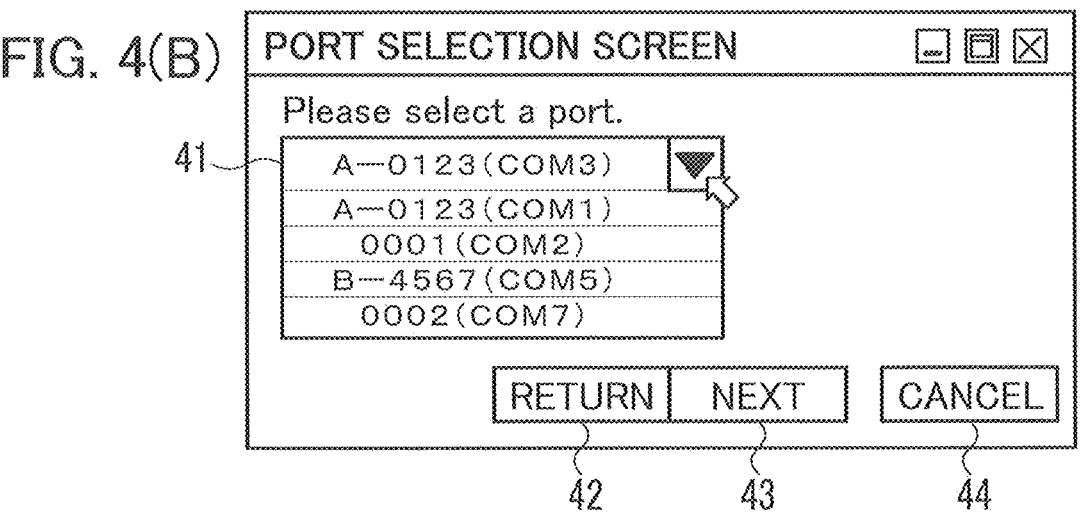

In the example shown in FIG. 4(B), the setup program 38 sets the device name "A-0123 (COM1)" to the upper portion of the display because this device name was acquired in S12 and is one of the device names acquired in S27. In the example shown in FIG. 4(B), a printer of the same model as the newly added printer 12 is already connected to the image processing device 11, and a communication port indicated by the name COM1 has already been set for this printer. Further, the added device name and the added COM port name "A-0123 (COM3)" are displayed in the topmost position above the device name "A-0123 (COM1)."

If the setup program 38 determines in S45 that no device name matching the device name acquired in S12 is included in the device names acquired in S27 (S45: NO), the setup program 38 skips the process of S46.

Next, the setup program 38 sets the display order for pairs of device names and COM port names among the pairs of device names and COM port names acquired in S27 excluding the pairs of the device names and the COM port names set in S46 to be displayed in the upper portion of the list. Note that the setup program 38 displays device names that do not match device names of printers supported by the printer driver 37 on the display 22 because the user or other individual may have modified the device names stored in the memory 32 from their original names.

In S47 the setup program 38 uses the MAC addresses and BT addresses acquired in S44 to determine whether the manufacturer of a printer specified by any device name acquired in S27 is a specific manufacturer. Here, the specific manufacturer is the manufacturer of printers supported by the printer driver 37.

That is, each MAC address or BT address is a unique address for a device. The MAC address or BT address has a segment that can identify the manufacturer (hereinafter called the "identification segment"). The setup program 38 is provided in advance with an identifier uniquely identifying the specific manufacturer. In S47 the setup program 38 determines whether any of the device names acquired in S27 have an identification segment in their MAC address or BT address acquired in S44 that matches the identifier. Hence, the setup program 38 determines in S47 whether at least one device name exists that specifies a printer manufactured by the specific manufacturer except for the device names determined to be displayed in the upper portion. The MAC address and the BT address are examples of the manufacturer information. The identifier provided in the setup program 38 is an example of the specific manufacturer information.

If the setup program 38 determines that there is at least one device name specifying a printer manufactured by the specific manufacturer except for the device names determined to be displayed in the upper portion (S47: YES), in S48 the setup program 38 determines that all device names specifying a printer of the specific manufacturer and their COM port names except for those determined to be displayed in the upper portion belong to a first group positioned in the middle portion of the display. The middle of the display signifies that the device name is to be displayed beneath the pairs of device names and the COM port names set in the upper portion of the display in S46.

In the example shown in FIG. 4(B), the setup program 38 displays the device name "0001" set to the middle portion of the display in S48 beneath the device name "A-0123" set to the upper portion of the display in S46.

If the setup program 38 determines in S47 that no device names specify a printer manufactured by the specific manufacturer (S47: NO), the setup program 38 skips the process in S48.

In S49 the setup program 38 sets device names other those set in S46 and S48 and their COM port names to a second group positioned in the lower portion of the display. The lower portion of the display signifies that the device names and their COM port names are to be displayed beneath device names set to the middle portion of the display in S48. The process of S48 for determining the first group and the process of S49 for determining the second group are examples of the group setting process.

In the example shown in FIG. 4(B), the setup program 38 displays device names "B-4567" and "0002" set to the lower portion of the display in S48 beneath the device name "0001" set to the middle portion of the display.

In S50 the setup program 38 displays the port selection screen (see FIG. 4(A) on the display 22 with the initial display name set in S41 showing in the pull-down menu 41. Subsequently, the setup program 38 waits while the user has not operated the pull-down menu 41 using the input devices 13 (S51: NO). Once the pull-down menu 41 has been operated (S51: YES), in S52 the setup program 38 displays the port selection screen (see FIG. 4(B)) on the display 22 showing the device names and the COM port names in the pull-down menu 41 listed in the display order set in S48 and S49, and subsequently ends the port selection display process. In the example shown in FIG. 4(B), COM port names COM4 and COM6 were set to devices that have since been disconnected from the information processing apparatus 11, and are not displayed in the pull-down menu 41.

The user can select the "Next" icon 43 after selecting a pair of a device name and a COM port name in one of the port selection screens shown in FIGS. 4(A) and 4(B) using the input devices 13. Alternatively, the user can select the "Return" icon 42 or the "Cancel" icon 44. The "Return" icon 42 instructs the setup program 38 to return to the screen displayed prior to the port selection screen. For example, when the "Return" icon 42 is selected, the setup program 38 displays the BT/USB selection screen on the display 22 (S13). The "Cancel" icon 44 instructs the setup program 38 to end the setup process. When the "Cancel" icon 44 is selected, the setup program 38 ends the setup process. The process of S32 in which the setup program 38 receives a selection for a device name and a COM port name using the pull-down menu 41 is an example of the reception process.

Figure 2:
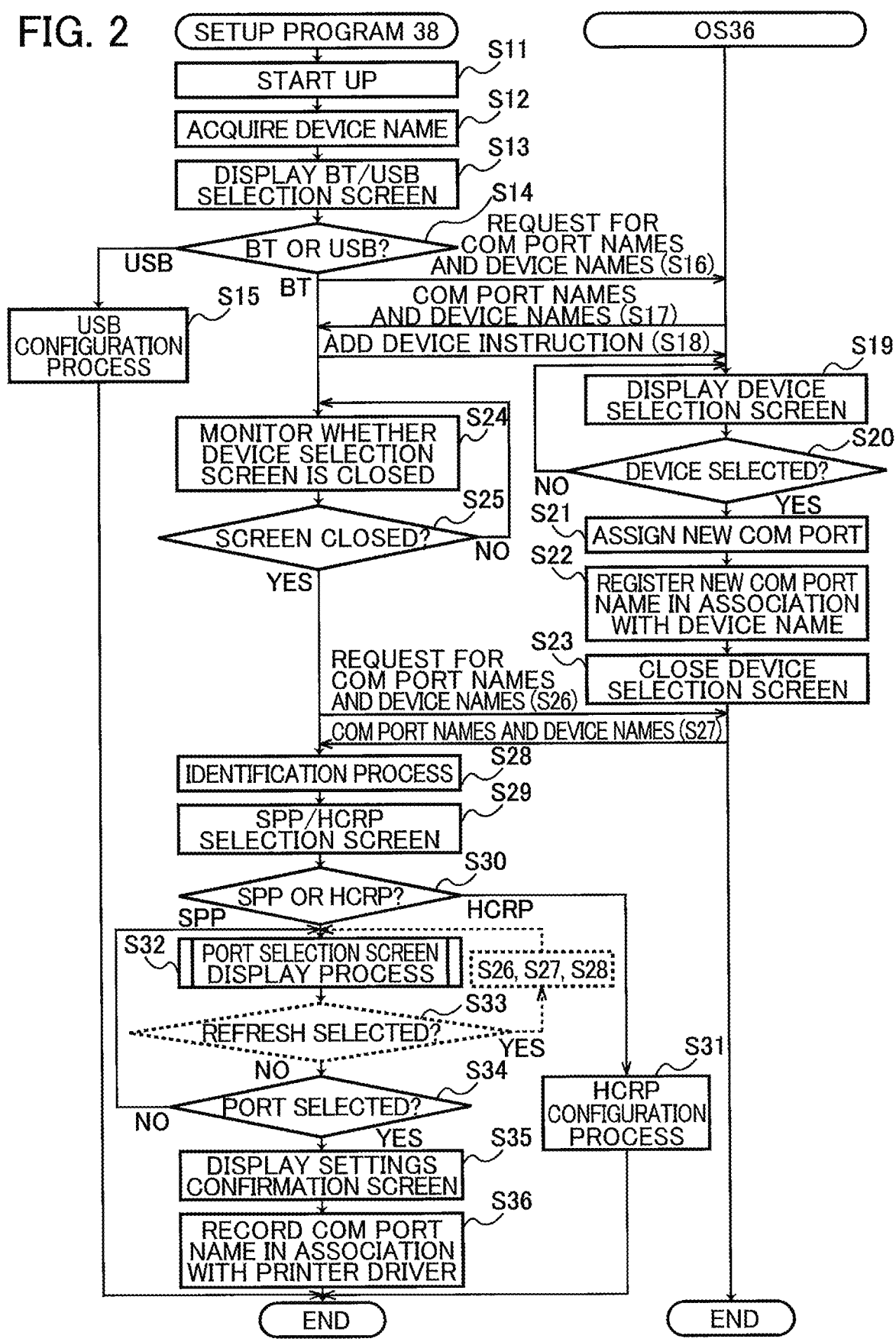
FIG. 2 is a sequence diagram illustrating a process in which a program setups a printer driver for the information processing apparatus.
Figure 3:
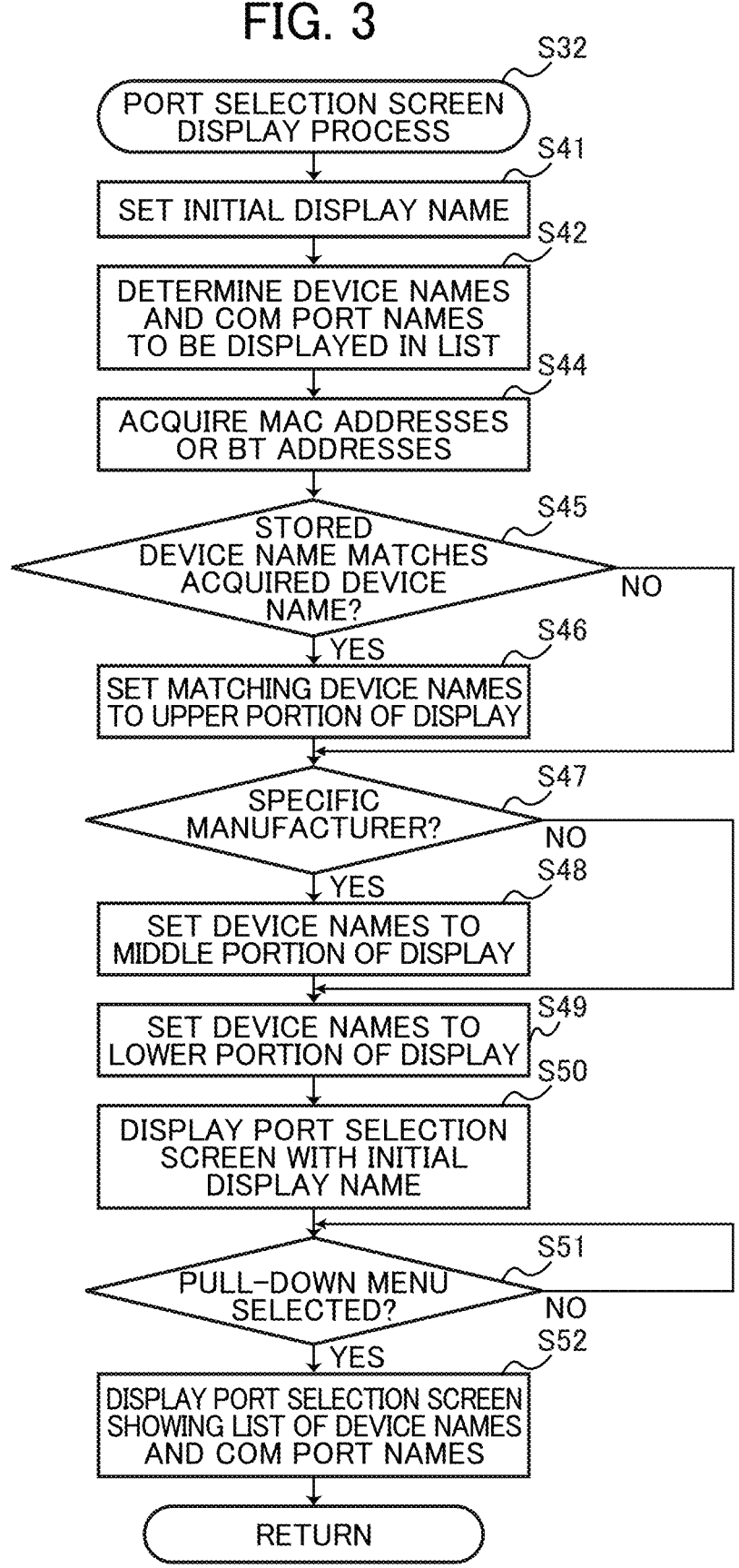
FIG. 3 is a flowchart illustrating a port selection screen display process.

In S34 of FIG. 2, the setup program 38 determines whether the "Next" icon 43 was selected in the port selection screen for fixing the port name and device name. Note that the process of S33 depicted with a dashed line will be described in a sixth variation of the embodiment.

Figure 4C:
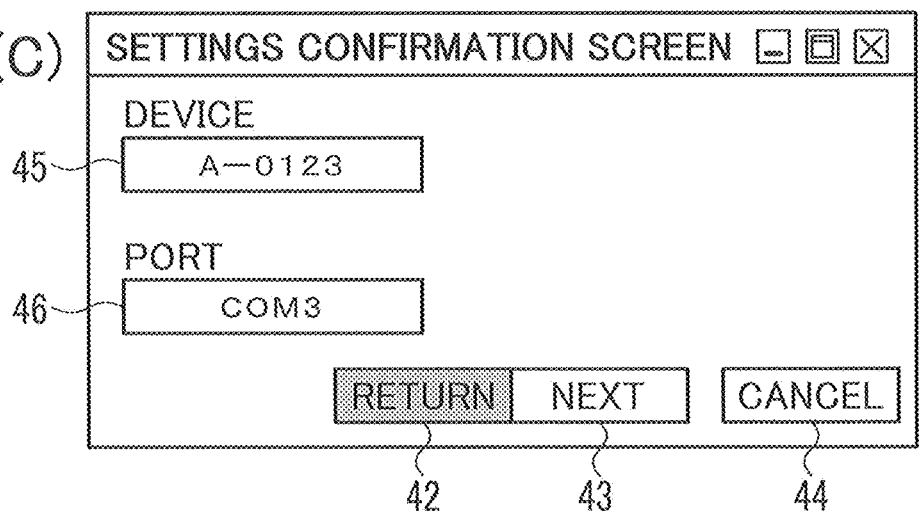
FIG. 4(C) is an explanatory diagram illustrating a settings confirmation screen.

The setup program 38 continues displaying the port selection screen on the display 22 in S32 while the "Next" icon 43 has not been selected (S34: NO). When the "Next" icon 43 is selected to determine a port name and device name (S34: YES), in S35 the setup program 38 displays a settings confirmation screen on the display 22. FIG. 4(C) shows an example of the settings confirmation screen.

The settings confirmation screen has the text "Device," a text box 45 displaying the device name "A-0123" set in S34, the text "Port," a text box 46 displaying the port name "COM3" set in S34, and the "Return" icon 42, "Next" icon 43, and "Cancel" icon 44. Here, the "Return" icon 42 is greyed out so as to be nonselectable.

While not shown in the flowchart of FIG. 2, the setup program 38 displays the settings confirmation screen on the display 22 until the "Next" icon 43 is selected. When the "Next" icon 43 is selected in the settings confirmation screen, in S36 of FIG. 2 the setup program 38 records the COM port name set in S34 in the OS 36 in association with the printer driver. Specifically, the setup program 38 inputs a command into the OS 36 that includes the COM port name, and the driver name specifying the printer driver 37, for example. When receiving the inputted command, the OS 36 stores the COM port name to be correlated with the driver name in the memory 32. The process of S36 in which the setup program 38 records the COM port name and the printer driver 37 to be correlated with each other is an example of the first registration process, the registration process, and the registration step. Here, the COM port name is associated with the device name of the printer 12 in the OS 36 The process of S36 in which the setup program 38 records a COM port name associated with a device name other than the printer 12 in the OS 36 to be correlated to the printer driver 37 is an example of the second registration process.

Thereafter, the printer driver 37 transmits print data to the printer 12 through the COM port specified by the COM port name correlated to the driver name.

While not shown in the flowchart, when the device names and COM port names acquired in S17 are identical to the device names and COM port names acquired in S27 and the setup program 38 cannot identify an added device name and added COM port name in the identification process of S28, the setup program 38 may display device names and COM port names on the display 22 in a predetermined display order and display format. The predetermined display order may be the alphabetic order of the display name, for example. The predetermined display format is a format in which the pair of the device names and the COM port names are arranged at regular intervals vertically or horizontally.

Effects of the Embodiment

In the identification process (S28), the setup program 38 identifies the COM port name newly assigned by the OS 36 and records in the OS 36 the printer driver 37 and the identified COM port name correlated with each other (S36). Hence, the setup program 38 can set up the printer driver 37 on the information processing apparatus 11 without the user having to execute an operation to access properties. Hence, the setup program 38 can save the user the trouble of having to access properties to confirm the device name.

The setup program 38 receives a selection of the device name and COM port name in the port selection screen (S34). Subsequently, the setup program 38 records the printer driver 37 in the OS 36 correlated to the user-selected device name and COM port name. Accordingly, the setup program 38 can register the printer driver 37 in the OS 36 in association with an added device (the printer 12) selected by the user in S20, or can register the printer driver 37 in the OS 36 in association with a device already connected to the information processing apparatus 11. For example, if the user wishes to connect a printer to the information processing apparatus 11 and to be able to communicate with the printer by SPP when the printer is already connected to the information processing apparatus 11 by HCRP, the user selects the device name in the port selection screen that indicates the desired printer. Note that in this case, the OS 36 closes the device selection screen (S23) without the user having selected a device name in S20, for example. Thus, the setup program 38 can select a new device according to the user's wishes and register the printer driver 37 in the OS 36 in association with the newly selected device, or can register the printer driver 37 in the OS 36 in association with a device already connected to the information processing apparatus 11.

As described above, the OS 36 has the notification function for returning all port names stored in the memory 32 and the device names associated with those port names in response to a request from another program implemented in the information processing apparatus 11, but does not have a function to return the port name for the most recently assigned communication port. However, by executing the process in steps S16, S17, S26, and S27 and the identification process (S28), the setup program 38 can identify the COM port name for the most recently assigned communication port. As a result, the setup program 38 can register the printer driver 37 in the OS 36 in association with a newly added device in the setup process.

As described above, the OS 36 has a correlating function for automatically correlating a printer driver to a communication port set for HCRP of BT, but does not have a correlating function for SPP of BT. However, the setup program 38 in the embodiment can set up the printer driver 37 for a communication profile for which the OS 36 does not automatically correlate the printer driver 37 to a port.

The setup program 38 displays the BT/USB selection screen on the display 22 and receives a selection for BT or USB (S13, S14). In response to receiving the selection BT, the setup program 38 sets up the printer driver 37 for BT on the information processing apparatus 11 (S36). When the selection USB is received, the setup program 38 sets up the printer driver 37 for USB on the information processing apparatus 11 (S15). Therefore, the setup program 38 can set up the printer driver 37 on the information processing apparatus 11 whether the user has selected BT or USB.

The setup program 38 displays the SPP/HCRP selection screen on the display 22 and receives a selection for SPP or HCRP (S29, S30). Upon receiving a selection for SPP, the setup program 38 sets up the printer driver 37 for SPP (S36). Hence, the setup program 38 can setup the printer driver 37 on the information processing apparatus 11 whether the user has selected SPP or HCRP.

The device name identified in the identification process (S28) is set to the initial display name in the pull-down menu 41, as illustrated in FIG. 4(A), and the setup program 38 displays the added device name identified in the identification process at the top when displaying the list of pairs of device names and COM port names, as illustrated in FIG. 4(B). Therefore, the setup program 38 facilitates operations for the user in selecting the added device name.

The setup program 38 displays device names and port names for printers having the same manufacturer as the printer 12 supported by the printer driver 37 higher in the port selection screen (see FIG. 4(B)) than device names and port names for printers having manufacturers different from the manufacturer of the printer 12. Therefore, the setup program 38 can assist the user in recognizing device names and port names of printers having the same manufacturer as the manufacturer of the printer 12 supported by the printer driver 37.

First Variation

In the embodiment described above, the port selection screen (FIG. 4(A)) is displayed on the display 22, and the user can select a device name and COM port name in the screen. However, the setup program 38 may skip the process in S32 and S34 and may simply display the settings confirmation screen displaying the added display name and the added COM port name shown in FIG. 4(C) on the display 22 (S35).

As an example, if the only device connected to the information processing apparatus 11 is the one that the user selected in S20, the setup program 38 may skip the process of S32 and S34 and display the settings confirmation screen (FIG. 4(C)) on the display 22 (S35). Specifically, when the setup program 38 does not acquire any device names and COM port names in S17 and acquires a single device name (the added device name) and a single COM port name (the added COM port name) in S27, the setup program 38 skips steps S32 and S34 and displays the settings confirmation screen on the display 22 (S35).

Alternatively, the setup program 38 may skip the process in S32 and S34 and may display the settings confirmation screen on the display 22 (S35) when the user selected a device in S20. Specifically, when the setup program 38 has identified in the identification process of S28 an added device name that specifies a device selected by the user in S20, the setup program 38 skips steps S32 and S34 and simply displays the settings confirmation screen on the display 22 (S35).

This variation can save the user the trouble of selecting a device name and a COM port name.

Second Variation

In the second variation, the setup program 38 may skip the process in S35 for displaying the settings confirmation screen on the display 22 in addition to skipping the process in S32 and S34. In other words, in S36 the setup program 38 may simply register the printer driver 37 in the OS 36 to be correlated to the added device name and added COM port name identified in the identification process of S28 without waiting to receive a user operation for selecting the "Next" icon 43 in the settings confirmation screen.

This variation can save the user even more trouble than the first variation since the printer driver 37 is set up without the user having to select the "Next" icon 43.

Third Variation

Here, a variation of the port selection screen will be described. In place of the port selection screen shown in FIGS. 4(A) and 4(B), the setup program 38 displays the port selection screen shown in FIG. 5(A) on the display 22 (S50).

Figure 5A:
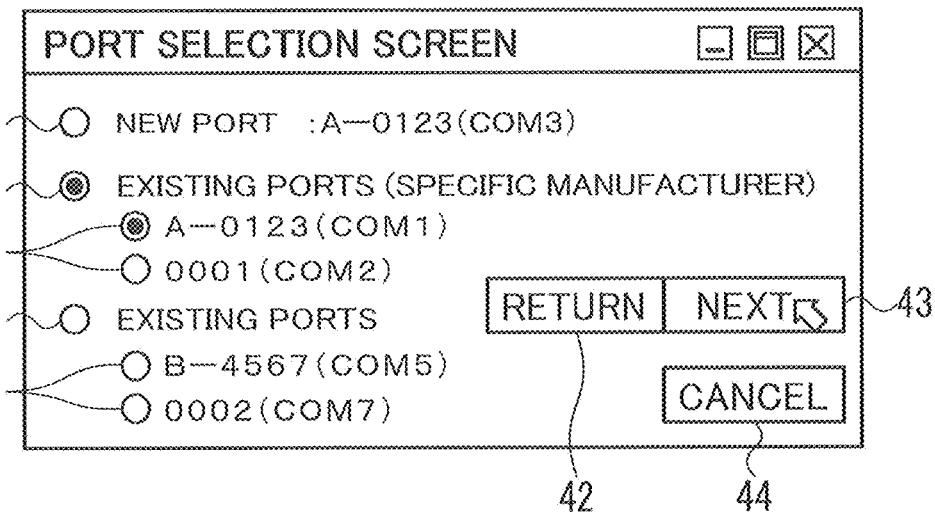
FIG. 5(A) is an explanatory diagram illustrating a port selection screen according to a third variation.

The port selection screen shown in FIG. 5(A) has a first radio button 51, the text "New port" positioned to the right of the first radio button 51, and the added device name and added COM port name positioned to the right of the "New port" text.

The port selection screen also has a second radio button 52 positioned beneath the first radio button 51, the text "Existing ports (specific manufacturer)" positioned to the right of the second radio button 52, third radio buttons 53 positioned beneath the second radio button 52, and device names and COM port names respectively positioned to the right of the third radio buttons 53.

The device names and the COM port names positioned to the right of the third radio buttons 53 are those device names specifying a printer of the specific manufacturer and their COM port names except the pair of the added device name and the added COM port name. Hereinafter, the device names specifying a printer of the specific manufacturer and their COM port names except the pair of the added device name and the added COM port name are referred to as the device names and the COM port names belonging to a third group. In other words, device names and COM port names for printers supported by the printer driver 37 except the pair of the added device name and the added COM port name are displayed to the right of the third radio buttons 53.

The port selection screen also has a fourth radio button 54 positioned beneath the third radio buttons 53, the text "Existing ports" positioned to the right of the fourth radio button 54, fifth radio buttons 55 positioned beneath the fourth radio button 54, and device names and COM port names positioned to the right of the fifth radio buttons 55.

The device names and the COM port names positioned to the right of the fifth radio buttons 55 are those device names and COM port names that belong to the second group established in S49. In the example of FIG. 5, "B-4567 (COM5)" and "0002 (COM7)" are displayed to the right of the fifth radio buttons 55.

The port selection screen shown in FIG. 5(A) may also be a device selection screen that prompts the user to select the model name of the device (printer).

In this variation, the added device name and added COM port name, the device names and the COM port names in the third group, and the device names and COM port names in the second group are displayed separately from each other. That is, the added device name and the added COM port name are displayed in a different format from the device names and the COM port names in the third group. Accordingly, the setup program 38 facilitates the user in recognizing the added device name and added COM port name, even when displaying a plurality of device names and COM port names.

The setup program 38 also facilitates the user in differentiating between device names and COM port names for printers having the same manufacturer as the manufacturer of the printer 12 supported by the printer driver 37 from other device names and COM port names.

Fourth Variation

Figure 5B:
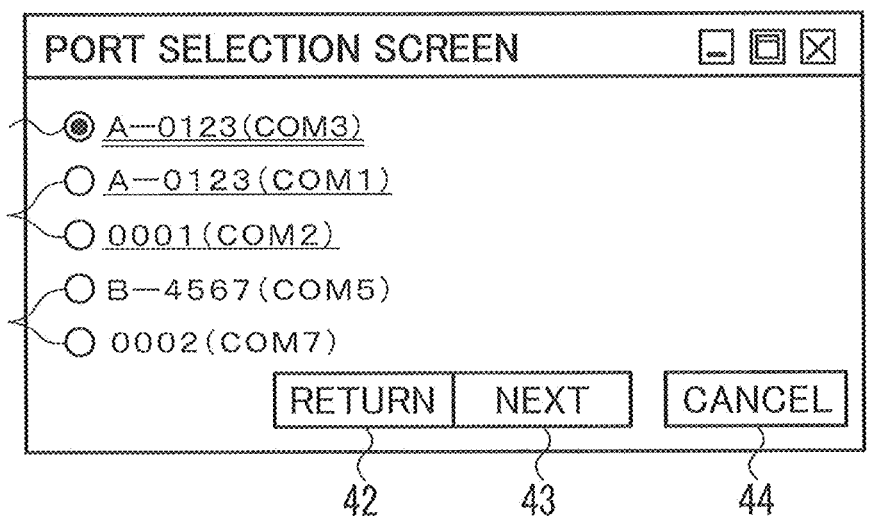
FIG. 5(B) is an explanatory diagram illustrating a port selection screen according to a fourth variation.

In this variation, the setup program 38 displays the port selection screen shown in FIG. 5(B) on the display 22 instead of the port selection screen shown in FIGS. 4(A) and 4(B).

The port selection screen shown in FIG. 5(B) has the first radio button 51, and the added device name and added COM port name positioned to the right of the first radio button 51. The added device name and added COM port name are positioned at the top of the display and double-underlined so as to be differentiated from the other device names and COM port names.

The port selection screen also has the third radio buttons 53 positioned beneath the first radio button 51, and device names and COM port names positioned to the right of the third radio buttons 53. The device names and COM port names positioned to the right of the third radio buttons 53 are those device names and COM port names belonging to the third group. The device names and COM port names positioned to the right of the third radio buttons 53 are single-underlined to distinguish them from device names and COM port names in the second group.

The port selection screen also has the fifth radio buttons 55, and device names and COM port names positioned to the right of the fifth radio buttons 55. The device names and COM port names positioned to the right of the fifth radio buttons 55 are those device names and COM port names belonging to the second group established in S49. The device names and COM port names positioned to the right of the fifth radio buttons 55 are not underlined.

In this variation, the device name and COM port name identified in the identification process, the device names and COM port names in the third group, and the device names and COM port names in the second group are differentiated from each other by the presence and types of underlines. That is, the added device name and added COM port name are displayed in a different format from the device names and COM port names in the third group. Accordingly, the setup program 38 facilitates the user in recognizing the added device name and added COM port name, even when displaying a plurality of device names and COM port names.

The setup program 38 also facilitates the user in differentiating device names and COM port names for printers having the same manufacturer as the manufacturer of the printer 12 supported by the printer driver 37 from other device names and COM port names by underlining the former and not the latter.

Fifth Variation

Figure 5C:
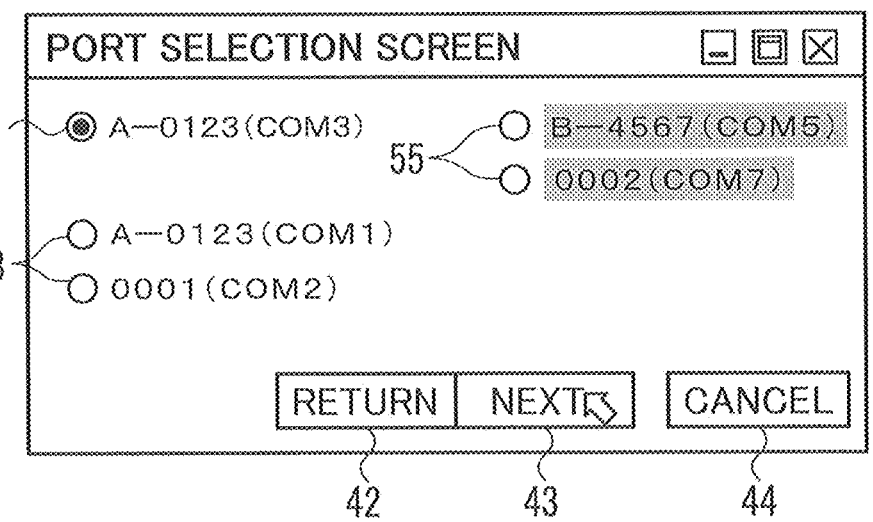
FIG. 5(C) is an explanatory diagram illustrating a port selection screen according to a fifth variation.

In this variation, the setup program 38 displays the port selection screen shown in FIG. 5(C) on the display 22 in place of the port selection screen shown in FIGS. 4(A) and 4(B).

The port selection screen shown in FIG. 5(C) has the first radio button 51, and the added device name and added COM port name positioned to the right of the first radio button 51. The added device name and added COM port name are positioned at the top of the display and are spaced apart from the device names and COM port names belonging to the second and third groups.

The port selection screen also has the third radio buttons 53 positioned beneath and separated from the first radio button 51, and device names and COM port names positioned to the right of the third radio buttons 53. The device names and COM port names to the right of the third radio buttons 53 are those device names and COM port names belonging to the third group. Device names and COM port names positioned to the right of the third radio buttons 53 are separated from the device names and COM port names belonging to the second group so as to be differentiated from the device names and COM port names in the second group.

The port selection screen also has the fifth radio buttons 55 disposed to the right of and separated from the added device name and added COM port name, and device names and COM port names positioned to the right of the fifth radio buttons 55. The device names and COM port names to the right of the fifth radio buttons 55 are those device names and COM port names that belong to the second group established in S49 and are displayed with a greyed-out effect.

In this variation, the added device name and added COM port name, the device names and COM port names belonging to the third group, and the device names and COM port names belonging to the second group are all separated from each other. In other words, the added device name and added COM port name are displayed in a different format from the device names and COM port names in the third group. Accordingly, the setup program 38 can facilitate the user in recognizing the added device name and added COM port name, even when displaying a plurality of device names and COM port names.

Further, by displaying the device names and COM port names in the second group with a greyed-out effect and in a separate location from the device names and COM port names for printers having the same manufacturer as the manufacturer of the printer 12 supported by the printer driver 37, the setup program 38 can facilitate the user in recognizing device names and COM port names for printers having the same manufacturer as the manufacturer of the printer 12 supported by the printer driver 37.

Sixth Variation

Figure 6A:
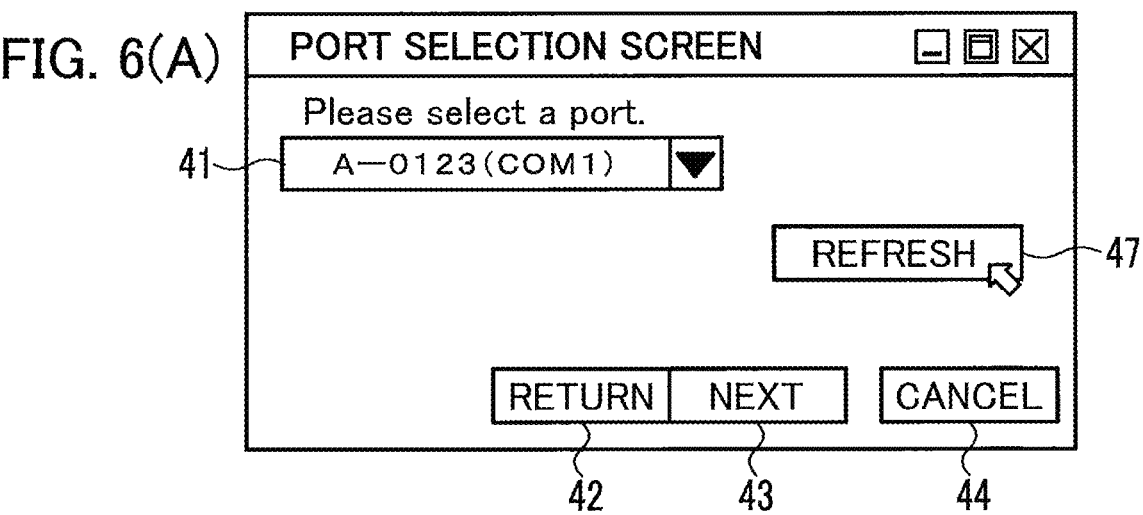
FIG. 6(A) is an explanatory diagram illustrating a port selection screen according to a sixth variation.

FIG. 6(A) shows a port selection screen according to the sixth variation. The port selection screen in this variation also has a "Refresh" icon 47. When operated, the "Refresh" icon 47 instructs the setup program 38 to re-acquire device names and COM port names from the OS 36 and to re-display any newly added devices on the display 22.

For example, in a case where a COM port has not been assigned for the printer 12 due to some problem in BT communications between the printer 12 and the information processing apparatus 11, for example, the user may wish to instruct the OS 36 to assign a communication port to the printer 12 in the background. In such a case, the user selects the "Refresh" icon 47. In addition, the user may select the "Refresh" icon 47 when the setup program 38 did not acquire device names and COM port names in S27 due to some problem and did not display the device names and COM port names in the port selection screen.

In this variation, the setup program 38 determines whether the "Refresh" icon 47 was selected in the port selection screen in S33 of FIG. 2. If the setup program 38 determines that the "Refresh" icon 47 was selected (S33: YES), in S26 the setup program 38 reissues a request to the OS 36 for COM port names stored in the memory 32 and device names associated with those COM port names. In S27 the setup program 38 receives the device names and COM port names from the OS 36. The setup program 38 then re-executes the identification process of S28 using the device names and COM port names acquired in S17 and the device names and COM port names re-acquired in S27.

In S32 the setup program 38 executes the process to display the port selection screen, and displays the added device name and added COM port name identified in the identification process on the display 22 at this time.

In this variation, the user can display on the display 22 the device name and COM port name of the printer 12 newly connected to the information processing apparatus 11 by selecting the "Refresh" icon 47. This saves the user the trouble of restarting the setup program 38 to re-execute the setup process. In other words, the setup program 38 can save the user trouble in setting up the printer driver. In the sixth variation, only the device names may be displayed in the pull-down menu 41 instead of the pairs of the device names and the COM port names, and the title of the screen may be a device selection screen instead of the port selection screen. In this case, if the user clicks the pull-down menu 41, the list of device names is displayed. That is, the list includes only device names but not includes port names. If the user selects the device name in the list, the COM port name associated with the selected device name is recorded in S36. Though the two COM port names COM1 and COM3 are associated with the device name "A-0123" as illustrated in FIG. 4(B), the single device name "A-0123" is displayed in the device selection screen, and the displayed device name "A-0123" is associated only with the added COM port name COM3, for example.

Seventh Variation

In the embodiment, both device names and COM port names are displayed in the port selection screen. In this variation, the setup program 38 displays both the device names and COM port names or just the device names alone, depending on the type of the printer 12. The type of the printer 12 may be a printer for industrial use or a printer for home use, for example. However, the number of types of printers is not limited to these two. Here, the industrial printer is an example of the first type, and the home printer is an example of the second type.

In the process of S32 for displaying the port selection screen, the setup program 38 determines the type of printer indicated by the device name acquired in S12. Specifically, the setup program 38 stores identification device names for determining the type of printer. Each identification device name may be a device name given to home printers, for example. The setup program 38 determines whether the device name acquired in S12 matches one of the identification device names. In other words, the setup program 38 determines whether the printer specified by the device name acquired in S12 is a home printer. Here, other determining methods may be used, provided that the type of printer can be determined.

If the setup program 38 determines that the printer specified by the device name acquired in S12 is not a home printer, and thus an industrial printer, the setup program 38 displays both device names and COM port names in the port selection screen. Specifically, the setup program 38 displays the port selection screen shown in FIGS. 4(A) and 4(B) on the display 22. Displaying the device names and COM port names in the port selection screen is an example of the first display format.

Figure 6B:
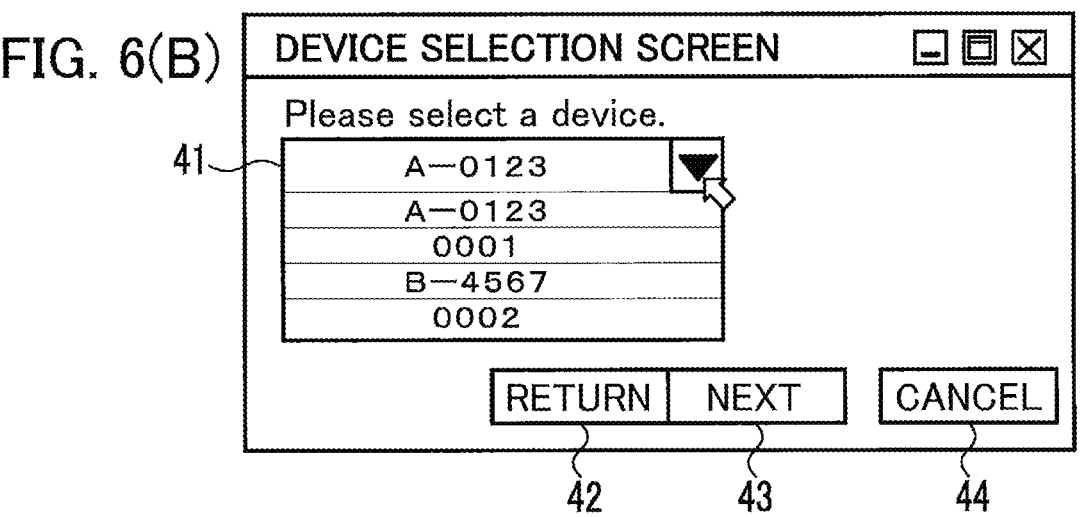
FIG. 6(B) is an explanatory diagram illustrating a device selection screen according to a seventh variation.

However, if the setup program 38 determines that the printer indicated by the device name acquired in S12 is a home printer, the setup program 38 displays only device names in the device selection screen. That is, the setup program 38 displays the device selection screen shown in FIG. 6(B) on the display 22. In the device selection screen of FIG. 6(B), only device names and not COM port names are displayed. Displaying only device names and not COM port names in the device selection screen is an example of the second display format. If the user selects the device name in the list, the COM port name associated with the selected device name is recorded in S36. Though the two COM port names COM1 and COM3 are associated with the device name "A-0123" as illustrated in FIG. 4(B), the single device name "A-0123" is displayed in the device selection screen of FIG. 6(B), and the displayed device name "A-0123" is associated only with the COM port name COM3, for example.

By not displaying COM port names in this variation when a common home printer is connected to the information processing apparatus 11, the setup program 38 can reduce the amount of information presented to the user, thereby further facilitating the user in selecting a device.

Other Variations

The embodiment describes an example of displaying both device names and COM port names in the port selection screen. However, the setup program 38 may simply display the COM port names in the process for displaying the port selection screen (S32). The display format for displaying only COM port names in the port selection screen is an example of the first display format, and the COM port names are an example of the display information.

Similarly, the setup program 38 may display only the device names in the process for displaying the port selection screen (S32). The display format for displaying only device names in the port selection screen is an example of the second display format, and the device names are an example of the display information.

Alternatively, the setup program 38 may display in the port selection screen information that is capable of identifying devices, such as the MAC addresses, IP addresses, or serial numbers of the devices, instead of device names. Information capable of identifying devices such as MAC addresses, IP addresses, and serial numbers is an example of the display information.

The embodiment describes a case in which the setup program 38 executes the identification process (S28) prior to displaying the SPP/HCRP selection screen on the display 22 (S29) and receiving a user selection for SPP or HCRP. However, the setup program 38 may execute the identification process of S28 after receiving a selection for SPP in S30. In this case, the identification process is not executed when the user selects HCRP. This variation can reduce the processing performed by the setup program 38 when the user selects HCRP, thereby reducing the processing load on the CPU 31. Alternatively, the setup program 38 may execute the identification process of S28 after BT is selected in S14.

Device names and port names belonging to the second group may not be displayed on the display 22. Specifically, in the embodiment, the device names and port names displayed in the port selection screen are the device name and port names identified in the identification process in S28, the device name(s) and port name(s) set in S46, the device names and port names belonging to the first group determined in S48, and the device names and port names belonging to the second group determined in S49. However, the embodiment may be modified as follows: the device names and port names displayed in the port selection screen may be the device name and port names identified in the identification process in S28, and the device name(s) and port name(s) set in S46, and the device names and port names belonging to the first group determined in S48 whereas the port selection screen may not display the device names and port names belonging to the second group determined in S49. The sixth variation may be modified similarly to the embodiment. Further, in the third, fourth, and fifth variations, the device names and port names displayed in the port selection screen are the device name and port names identified in the identification process in S28, the device names and port names belonging to the third group, and the device names and port names belonging to the second group. However, the third, fourth, and fifth variations may be modified as follows: the device names and port names displayed in the port selection screen may be the device name and port names identified in the identification process in S28, and the device names and port names belonging to the third group whereas the port selection screen may not display the device names and port names belonging to the second group.

In the embodiment and its variations, the port selection screen shown in FIGS. 4(A), 4(B) and 5(A)-5(C) may be a device selection screen for selecting a device name. The device names and model names of printers may be displayed as selections in the device selection screen.

In the third, fourth, and fifth variations, the added device name and added COM port name, the device names and COM port names belonging to the third group, and the device names and COM port names belonging to the second group are differentiated with each other in the port selection screen. The device names belonging to the third group may be further classified to a first sub group matching the device name (A-0123) acquired in S12 or a second sub group not matching the device name acquired in S12. Thus, the device names and COM port names in the first subgroup and the device name and COM port names in the second sub group may be displayed differentiated with each other and differentiated with the added device name and added COM port name, and the device names and COM port names belonging to the second group, in the third, fourth, and fifth variations.

What is claimed is:

1. A non-transitory computer readable storage medium storing a set of program instructions executed by a computer included in an information processing apparatus, the information processing apparatus further including a communication interface and a memory storing an operating system, the operating system having a function to register a device port name and device information associated with each other in the memory, the device information indicating a device, the device port name indicating a device port defined for the communication interface to communicate with the device,
wherein the set of program instructions is for setting up a software, the set of program instructions, when executed by the computer, causing the information processing apparatus to perform:
firstly acquiring all device port names registered in the memory;
instructing the operating system to register new device information indicating a new device after the all device port names are acquired, the operating system registering the new device information and a new device port name associated to each other in the memory according to the instructing, the new device port name being a name of a new device port defined for the communication interface;
determining whether the operating system completes registering the new device information according to the instructing;
secondly acquiring, in response to determining that the operating system completes registering the new device information, all device port names including the new device port name associated with the new device information from the memory;
identifying the new device port name which is included in the secondly acquired device port names but excluded from the firstly acquired device port names by comparing the firstly acquired device port names with the secondly acquired device port names; and
registering in the operating system the new device port name and the software to be correlated with each other so that the software can communicate with the new device through the new device port defined for the communication interface.

2. The non-transitory computer readable storage medium according to claim 1, wherein the information processing apparatus further includes a display and a user interface,
wherein the set of program instructions, when executed by the computer, causes the information processing apparatus to further perform:
displaying display information indicating candidate devices on the display so that one of the candidate devices can be selected, the candidate devices including the new device and another device which is associated with another device port name in the memory;
receiving selection of a device made by using by the user interface through the display information displayed on the display; and
in response to receiving selection of another device different from the new device through the display information displayed on the display, registering the another device port name and the software to be correlated with each other,
wherein in response to receiving selection of the new device through the display information displayed on the display, the registering the new device port name and the software is executed.

3. The non-transitory computer readable storage medium according to claim 2, wherein the display information is displayed on the display in such a manner that the new device port name and at least one of the secondly-acquired all device port names are selectable.

4. The non-transitory computer readable storage medium according to claim 2, wherein the device information includes a device name,
wherein the secondly acquiring includes acquiring from the memory all device names associated with all device port names in the memory,
wherein the display information is displayed on the display in such a manner that the new device name and at least one of the all device names acquired in the secondly acquiring are selectable.

5. The non-transitory computer readable storage medium according to claim 2, wherein the device information includes a device name,
wherein the set of program instructions, when executed by the computer, causes the information processing apparatus to further perform acquiring a target device name indicating a target device operatively supported by the software, wherein the secondly acquiring includes acquiring from the memory all device names associated with all device port names in the memory, wherein the secondly acquiring includes acquiring from the memory all device names associated with all device port names in the memory, wherein the display information is displayed on the display in selective one of the first manner and a second manner, wherein in the first manner, the display information is displayed on the display so that the new device port name and at least one of the secondly-acquired all device port names are selectable, wherein in the second manner, the display information is displayed on the display so that the new device name associated with the new device port name and at least one of the device names are selectable, wherein the display information is displayed on the display in the first manner in a case where the target device is classified as a first device type, wherein the display information is displayed on the display in the second manner in a case where the target device is classified as a second device type different from the first device type.

6. The non-transitory computer readable storage medium according to claim 1, wherein the operating system has a function to notify other programs of all device port names registered in the memory in response to a request, but does not have a function to notify other programs of a newly-registered device port name only.

7. The non-transitory computer readable storage medium according to claim 1, wherein the operating system does not have a first registration function to register a device port name and a supporting software to be correlated to each other in a case where a first communication profile is to be used for a device port indicated by the device port name, the supporting software supporting a device associated with the device port name.

8. The non-transitory computer readable storage medium according to claim 7, wherein the operating system has a second registration function to register the device port name and the supporting software to be correlated with each other in a case where a second communication profile different from the first communication profile is to be used for the device port indicated by the device port name, wherein the set of program instructions, when executed by the computer, causes the information processing apparatus to further perform receiving a selected profile selected by a user among the first communication profile and the second communication profile, wherein the firstly acquiring, the instructing, the determining, the secondly acquiring, the identifying, and the registering are performed in a case where the selected profile is the first communication profile.

9. The non-transitory computer readable storage medium according to claim 1, wherein the set of program instructions, when executed by the computer, causes the information processing apparatus to further perform:

receiving a profile selected by a user among a plurality of communication profiles;

determining whether the selected profile is a prescribed specific communication profile; and a normal setup process in a case where the selected profile is not the prescribed specific communication profile, wherein the firstly acquiring, the instructing, the determining, the secondly acquiring, the identifying, and the registering are performed in a case where the selected profile is the prescribed specific communication profile.

10. The non-transitory computer readable storage medium according to claim 1, wherein the set of program instructions, when executed by the computer, causes the information processing apparatus to further perform receiving a profile selected by a user from a first communication profile and a second communication profile different from the first communication profile, wherein the identifying is not performed in a case where the selected profile is the first communication profile whereas the identifying is performed in a case where the selected profile is the second communication profile.

11. The non-transitory computer readable storage medium according to claim 2, wherein in the display information, information indicating the new device is displayed at a position higher than information indicating remaining devices.

12. The non-transitory computer readable storage medium according to claim 2, wherein in the display information, information concerning the new device is displayed in a manner different from information concerning remaining devices.

13. The non-transitory computer readable storage medium according to claim 1, wherein the registering is executed without receiving a user instruction to execute the registering.

14. The non-transitory computer readable storage medium according to claim 1, wherein in a case where no device port name is acquired in the first acquiring and one device port name is acquired in the second acquiring, the registering is executed without receiving a user instruction to execute the registering.

15. The non-transitory computer readable storage medium according to claim 1, wherein the set of program instructions, when executed by the computer, causes the information processing apparatus to further perform receiving an instruction to execute acquiring again all device port names after the identifying is performed.

16. The non-transitory computer readable storage medium according to claim 2, wherein the set of program instructions includes specific manufacturer information indicating a specific manufacturer, wherein each of the firstly acquiring and the secondly acquiring includes acquiring, for each of the all device port names, manufacturer information which identifies a manufacturer of a device associated with the each of the all device port names, wherein the set of program instructions, when executed by the computer, causes the information processing apparatus to further perform:

classifying each of the secondly-acquired device port names into a first group or a second group, wherein a device port name whose manufacturer information matches the specific manufacturer information is classified into the first group whereas a device port name whose manufacturer information is different from the specific manufacturer information is classified into the second group, wherein in the display information, device port names classified into the first group are displayed in a manner different from device port names classified into the second group.

17. The non-transitory computer readable storage medium according to claim 2, wherein the set of program instructions includes specific manufacturer information indicating a specific manufacturer,
- wherein each of the firstly acquiring and the secondly acquiring includes acquiring, for each of the all device port names, manufacturer information which identifies a manufacturer of a device associated with the each of the all device port names,
- wherein the set of program instructions, when executed by the computer, causes the information processing apparatus to further perform:
- classifying each of the secondly-acquired device port names into a first group or a second group, wherein a device port name whose manufacturer information matches the specific manufacturer information is classified into the first group whereas a device port name whose manufacturer information is different from the specific manufacturer information is classified into the second group,
- wherein in the display information, device port names classified into the first group are displayed whereas device port names classified into the second group are not displayed.

18. The non-transitory computer readable storage medium according to claim 2, in a case where the firstly-acquired all device port names identical to the secondly-acquired all device port names, the acquired all device port names in a prescribed manner on the display.

19. An information processing apparatus comprising:
- a communication interface;
- a memory storing an operating system, the operating system having a function to register a device port name and device information associated with each other in the memory, the device information indicating a device, the device port name indicating a device port defined for the communication interface to communicate with the device; and
- a processor,
- wherein the memory further stores instructions for setting up a software, when executed by the processor, causing the processor configured to perform:
  - firstly acquiring all device port names registered in the memory;
  - instructing the operating system to register new device information indicating a new device after the all device port names are acquired, the operating system registering the new device information and a new device port name associated to each other in the memory according to the instructing, the new device port name being a name of a new device port defined for the communication interface;
  - determining whether the operating system completes registering the new device information according to the instructing;
  - secondly acquiring, in response to determining that the operating system completes registering the new device information, all device port names including the new device port name associated with the new device information from the memory;
  - identifying the new device port name which is included in the secondly acquired device port names but excluded from the firstly acquired device port names by comparing the firstly acquired device port names with the secondly acquired device port names; and
  - registering in the operating system the new device port name and the software to be correlated with each other so that the software can communicate with the new device through the new device port defined for the communication interface.

20. A method for an information processing apparatus, the information processing apparatus including a communication interface and a memory storing an operating system, the operating system having a function to register a device port name and device information associated with each other in the memory, the device information indicating a device, the device port name indicating a device port defined for the communication interface to communicate with the device,
the method being for setting up a software and comprising:
- firstly acquiring all device port names registered in the memory;
- instructing the operating system to register new device information indicating a new device after the all device port names are acquired, the operating system registering the new device information and a new device port name associated to each other in the memory according to the instructing, the new device port name being a name of a new device port defined for the communication interface;
- determining whether the operating system completes registering the new device information according to the instructing;
- secondly acquiring, in response to determining that the operating system completes registering the new device information, all device port names including the new device port name associated with the new device information from the memory;
- identifying the new device port name which is included in the secondly acquired device port names but excluded from the firstly acquired device port names by comparing the firstly acquired device port names with the secondly acquired device port names; and
- registering in the operating system the new device port name and the software to be correlated with each other so that the software can communicate with the new device through the new device port defined for the communication interface.

\* \* \* \* \*